United States Patent
Jha et al.

(10) Patent No.: US 11,827,377 B2
(45) Date of Patent: Nov. 28, 2023

(54) EXTERIOR AIRCRAFT LIGHT AND AIRCRAFT COMPRISING THE SAME

(71) Applicant: Goodrich Lighting Systems GmbH & Co. KG, Lippstadt (DE)

(72) Inventors: Anil Kumar Jha, Lippstadt (DE); Marion Depta, Lippstadt (DE); Andre Hessling-Von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/873,389

(22) Filed: Jul. 26, 2022

(65) Prior Publication Data
US 2023/0032844 A1 Feb. 2, 2023

(30) Foreign Application Priority Data
Jul. 28, 2021 (EP) .................................... 21188249

(51) Int. Cl.
| | |
|---|---|
| *B64D 47/06* | (2006.01) |
| *F21S 43/40* | (2018.01) |
| *F21S 43/14* | (2018.01) |
| *F21S 43/31* | (2018.01) |
| *F21V 5/04* | (2006.01) |
| *F21V 7/00* | (2006.01) |

(Continued)

(52) U.S. Cl.
CPC .............. *B64D 47/06* (2013.01); *F21S 43/14* (2018.01); *F21S 43/31* (2018.01); *F21S 43/40* (2018.01); *F21V 5/045* (2013.01); *F21V 7/0033* (2013.01); *B64D 2203/00* (2013.01); *F21W 2107/30* (2018.01); *F21Y 2115/10* (2016.08)

(58) Field of Classification Search
CPC .................. B64D 2203/00; F21S 43/14; F21S 43/20–40; F21V 5/045; F21V 7/0025–0033; F21V 13/00–04
See application file for complete search history.

(56) References Cited

U.S. PATENT DOCUMENTS

| | | |
|---|---|---|
| 3,818,218 A | 6/1974 | Heenan et al. |
| 7,236,105 B2 | 6/2007 | Brenner et al. |

(Continued)

FOREIGN PATENT DOCUMENTS

| | | |
|---|---|---|
| EP | 2985227 A1 | 2/2016 |
| EP | 3543145 A1 | 9/2019 |

OTHER PUBLICATIONS

European Search Report for Application No. 21188249.3, dated Jan. 21, 2022, 7 pages.

*Primary Examiner* — Jason M Han
(74) *Attorney, Agent, or Firm* — CANTOR COLBURN LLP

(57) ABSTRACT

An exterior aircraft light includes a mounting board, a light source arranged on the mounting board and a lens arranged over the light source. The lens includes a first lens portion on a first side of a cross-sectional center plane, which is orthogonal to the mounting board and which runs through the light source, and a second lens portion on a second side of the cross-sectional center plane. The light also includes a reflector, arranged to reflect light, emitted by the light source into the first lens portion, towards the second lens portion, wherein the lens fully encloses the light source and the reflector.

13 Claims, 6 Drawing Sheets

(51) Int. Cl.
*F21Y 115/10* (2016.01)
*F21W 107/30* (2018.01)

(56) References Cited

U.S. PATENT DOCUMENTS

| | | | |
|---|---|---|---|
| 7,566,911 B2* | 7/2009 | Jyo | H01L 33/62 |
| | | | 257/E33.072 |
| 7,674,018 B2* | 3/2010 | Holder | F21V 29/70 |
| | | | 362/311.06 |
| 7,794,110 B2 | 9/2010 | Hirni et al. | |
| 7,959,326 B2* | 6/2011 | Laporte | F21V 14/06 |
| | | | 362/249.02 |
| 9,080,746 B2* | 7/2015 | Chen | F21V 5/04 |
| 9,731,841 B2* | 8/2017 | Jha | B64D 47/06 |
| 10,408,430 B2* | 9/2019 | Jung | F21V 15/01 |
| 10,919,644 B2 | 2/2021 | Pawliczek et al. | |
| 10,974,847 B2 | 4/2021 | Hessling-Von Heimendahl et al. | |
| 2017/0233101 A1 | 8/2017 | Hessling-Von Heimendahl et al. | |
| 2019/0382132 A1 | 12/2019 | Jha et al. | |
| 2020/0189766 A1 | 6/2020 | Jha | |

* cited by examiner (a)

(b)

(c)

EXTERIOR AIRCRAFT LIGHT AND AIRCRAFT COMPRISING THE SAME

CROSS-REFERENCE TO RELATED APPLICATIONS

This application claims priority to European Patent Application No. 21188249.3 filed Jul. 28, 2021, the entire contents of which is incorporated herein by reference.

TECHNICAL FIELD

The present invention relates to an exterior aircraft light and an aircraft comprising the same.

BACKGROUND

Almost all aircraft are equipped with exterior lights. In particular, large passenger air planes are provided with a wide variety of exterior lights. An exemplary group of exterior aircraft lights are lights for passive visibility, such as navigation lights, white strobe anti-collision lights, red flashing beacon lights and logo lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights and engine scan lights.

Each exterior aircraft light has its own functionality, and various reflective and/or refractive optics have been employed to shape an output light intensity distribution in a particular manner for implementing such functionality. Exterior aircraft lights are also supposed to operate in very hazardous conditions. Depending on their location on the aircraft, they may have to withstand large aerodynamic forces, strong vibrations, large temperature variations and/or hazardous gases, such as exhaust fumes.

Accordingly, it would be beneficial to provide an exterior aircraft light that allows for both a high degree of freedom to shape an output light intensity distribution and good protection from the hazardous environment exposure and to provide an aircraft comprising such exterior aircraft light.

SUMMARY

Exemplary embodiments of the invention include an exterior aircraft light, comprising of a mounting board, a light source arranged on the mounting board, a lens arranged over the light source, the lens comprising a first lens portion on a first side of a cross-sectional center plane, which is orthogonal to the mounting board and which runs through the light source, and comprising a second lens portion on a second side of the cross-sectional center plane, and a reflector, arranged to reflect light, emitted by the light source into the first lens portion, towards the second lens portion, wherein the lens fully encloses the light source and the reflector.

The lens has a refractive outer surface, and the reflector is arranged to reflect at least part of the light, emitted by the light source into the first lens portion, towards the second lens portion. In this way, the lens and the reflector jointly shape at least part of the output light intensity distribution of the exterior aircraft light. Providing the reflector within the first lens portion and having the reflector and the lens cooperate in the generation of the output light intensity distribution provides for a framework hat has a high degree of freedom to direct light to desired output directions. The lens and the reflector and their interaction, in particular their subsequent effects on the light emitted by the light source, may be used for achieving a desired output light intensity distribution in an effective manner. Also, a high light yield in desired directions/a high light output efficiency may be achieved.

The lens is configured to fully enclose the light source and the reflector. This may allow for highly effective protection of the exterior aircraft light, in particular of the reflector and the light source, from the hazardous environment, such as from exposure to large aerodynamic forces, strong vibrations, large temperature variations and/or hazardous gases like exhaust fumes. The lens may have an integral structure that is in direct contact with and fully encompasses the light source and the reflector. The lens may have a solid lens body that fills substantially the entire space or the entire space between the refractive outer surface of the lens and the mounting board. The lens may be intimately formed around the reflector and onto the mounting board. In an embodiment, the lens is a one-piece silicone structure or an integral silicone structure.

The reflector may have various shapes, depending on its purpose and usage. For example, the reflector may have a cylindrical shape, i.e. the shape of a portion of a hollow cylinder, or a spherical shape, i.e. the shape of a portion of a hollow sphere, or an ellipsoidal shape, i.e. the shape of a portion of an ellipsoid. The reflector may have an extension to reflect between 25% and 50% of the light output of the light source. The reflector may be fully arranged in the first lens portion. It is also possible that part of the reflector may be extended into the second lens portion. For example, when being measured as a percentage of a reflective surface of the reflector, between 70% and 100%, in particular between 80% and 100%, further in particular between 90% and 100%, of the reflector may be arranged in the first lens portion. In this way, the reflector may have a large impact on the light emitted into the first lens portion. The reflector may contribute to providing a non-symmetric output light intensity distribution in a highly efficient manner. In particular, the reflector may collect light, which would otherwise be lost in undesired directions as waste light, and may help to re-direct said light to desired directions of a non-symmetric output light intensity distribution.

The reflector is arranged to reflect light, emitted by the light source into the first lens portion, towards the second lens portion. The expression of the reflector reflecting light towards the second lens portion does not necessarily mean that the reflected light has to travel through the second lens portion, i.e. that the reflected light has to reach the second lens portion. Rather, the expression may describe all kinds of reflections where the reflected light is directed more towards the second lens portion than before the reflection. Stated differently, the expression of the reflector reflecting light towards the second lens portion may refer to all cases where the reflected light has a smaller angle with respect to the cross-sectional center plane than before the reflection or where the reflected light actually travels through the cross-sectional center plane, either within the lens or outside of the lens. It is in particular possible that a portion of the reflected light travels through the second lens portion and another portion of the reflected light leaves the lens from the first lens portion.

According to a further embodiment, the reflector has such an extension, position, and shape that between 70% and 100%, in particular between 80% and 100%, further in particular between 90% and 100%, of light, emitted by the light source and reflected by the reflector, is reflected to travel through the second lens portion. In this way, a desired output light intensity distribution of the exterior aircraft light that is heavily lopsided towards the first side of the cross-sectional center plane can be shaped in an efficient manner.

According to a further embodiment, the lens, in particular the second lens portion of the lens, has a secondary light conditioning surface, arranged to re-direct light, emitted by the light source and reflected by the reflector. The secondary light conditioning surface may in particular be arranged to collimate light, emitted by the light source and reflected by the reflector. The secondary light conditioning surface may be arranged to provide total internal reflection for light, emitted by the light source and reflected by the reflector. It is also possible that the secondary light conditioning surface is arranged to refract light, emitted by the light source and reflected by the reflector. The secondary light conditioning surface may also comprise a total internal reflection surface and a refraction surface. The total internal reflection surface and/or the refraction surface may be configured to shape the output light intensity distribution/portions of the output light intensity distribution for particular purposes. The secondary light conditioning surface is an effective means of directing light, as collected over a comparably wide solid angle by the reflector, into desired directions via a comparably small light conditioning surface. The secondary light conditioning surface may have an extension, when seen from the light source, that is much smaller than the extension of the reflector, when seen from the light source, and may still effectively cooperate with the reflector to have a large impact on the output light intensity distribution.

In an embodiment, the secondary light conditioning surface is formed as a protrusion. Alternatively, the secondary light conditioning surface may be formed as an indentation or may have a Fresnel lens shape. The secondary light conditioning surface may also have other types of geometries, depending on the type of the exterior aircraft light and/or the light intensity distribution to be achieved. The term protrusion/indentation may refer to the embodiment of the secondary light conditioning surface with respect to the outer surface of the lens, in particular with respect to the outer surface of the second lens portion of the lens.

According to a further embodiment, the reflector has, in at least one cross-sectional plane, an elliptical shape having a first focal point at the light source and a second focal point at the secondary light conditioning surface. In this way, light emitted by the light source and reflected by the reflector can be redirected to the secondary light conditioning surface in an effective manner. The reflector may have an elliptical shape in a plurality of cross-sectional planes. In particular, the reflector may have an ellipsoidal reflective surface.

According to a further embodiment, the secondary light conditioning surface is arranged to re-direct between 50% and 100%, in particular between 60% and 100%, further in particular between 70% and 90%, of light, emitted by the light source and reflected by the reflector, and/or the secondary light conditioning surface is arranged to re-direct between 0% and 10%, in particular between 0% and 5%, of light, emitted by the light source and not reflected by the reflector. In this way, the secondary light conditioning surface may have a large impact on light reflected by the reflector and may, thus, be highly effective in contributing to the generation of a desired output light intensity distribution. Further, the secondary light conditioning surface may have a low effect on light coming from the light source directly to the secondary light conditioning surface. In this way, potentially undesired effects of the secondary light conditioning surface on the output light intensity distribution may be kept very low.

According to a further embodiment, the light source is or comprises an LED. It is also possible that a plurality of LEDs are employed as the light source. By employing one or more LEDs, a highly reliable and highly energy-efficient exterior aircraft light may be employed. Also, LED(s) may be integrated into the lens particularly well, in particular when the lens is overmolded over the LED(s). Further, with LED(s) being very small light source(s), the distance between the reflector and the light source and the extension of the reflector may be kept low, while still providing for well-defined optical properties.

According to a further embodiment, the lens is overmolded over the light source and the light reflector, and/or the lens is made from a light transmissive silicone, in particular from a transparent silicone. That is, the lens may be produced via a molding operation onto the light source and the reflector. In this way, the lens may be brought into the desired shape in a single molding operation and may, at the same time, be integrated firmly with the mounting board and/or the light source and/or the reflector, which may allow for an efficient production of the exterior aircraft light. Silicones have been found to provide good optical properties, while at the same time providing effective protection of enclosed components in the field of exterior aircraft lighting.

According to a further embodiment, the exterior aircraft light is one of a forward navigation light, a beacon light, and/or a combined wing and engine scan light. By configuring the lens, the reflector, and the secondary light conditioning surface in a suitable manner, the exterior aircraft light according to exemplary embodiments of the invention can be adapted well to different types of exterior aircraft lights. For the forward navigation light, the reflective action of the reflector, potentially in combination with the additional light conditioning effect of the secondary light conditioning surface, has been found to be an effective means for contributing to a high light intensity peak in/around the flight direction of the aircraft, while the exterior aircraft light, in particular the lens thereof, efficiently achieves a decaying output light intensity distribution in outboard directions. For the beacon light, the reflective action of the reflector, potentially in combination with the additional light conditioning effect of the secondary light conditioning surface, has been found to be an effective means for contributing to a high light intensity peak in/around a horizontal plane of the aircraft and for effectively making use of light that would have gone to waste towards the aircraft fuselage in the absence of the reflector. For the combined wing scan and engine scan light, the reflective action of the reflector, potentially in combination with the additional light conditioning effect of the secondary light conditioning surface, has been found to be an effective means for generating a focused high intensity region in the direction of the engine, while the exterior aircraft light, in particular the lens thereof, efficiently achieves an extended illumination along the front edge of the wing of the aircraft.

Exemplary embodiments of the invention further include an aircraft, such as an air plane or a helicopter, comprising at least one exterior aircraft light, as described in any of embodiments above, arranged on an outside of the aircraft. In particular, the exterior aircraft light may be a forward navigation light, arranged in a wing tip region of the aircraft, with the first lens portion facing a fuselage of the aircraft and the second lens portion facing a wing tip of the aircraft. In an alternative embodiment, the exterior aircraft light may be a beacon light, arranged on the top or the bottom of a fuselage of the aircraft, with the first lens portion facing the fuselage of the aircraft. The term beacon light refers to a red-flashing exterior aircraft light that may be primarily used for indicating that the engines of the aircraft are running, when the aircraft is on the ground. The beacon light may have multiple lighting modules, with each lighting module comprising a combination of a mounting board, a light source, a lens, and a reflector, as described herein. The multiple lighting modules may be arranged in a polygonal arrangement around a center of the beacon light. They may thus provide for the provision of a 360° beacon light output in a horizontal plane of the aircraft. In a further alternative embodiment, the exterior aircraft light may be a combined wing and engine scan light, arranged in a side portion of a fuselage of the aircraft. The modifications, additional features, and effects, discussed above with respect to the embodiments of the exterior aircraft light, equally apply to the aircraft as a whole.

BRIEF DESCRIPTION OF DRAWINGS

Further exemplary embodiments of the invention are described with respect to the accompanying drawings, wherein.

DETAILED DESCRIPTION

Figure 1A:
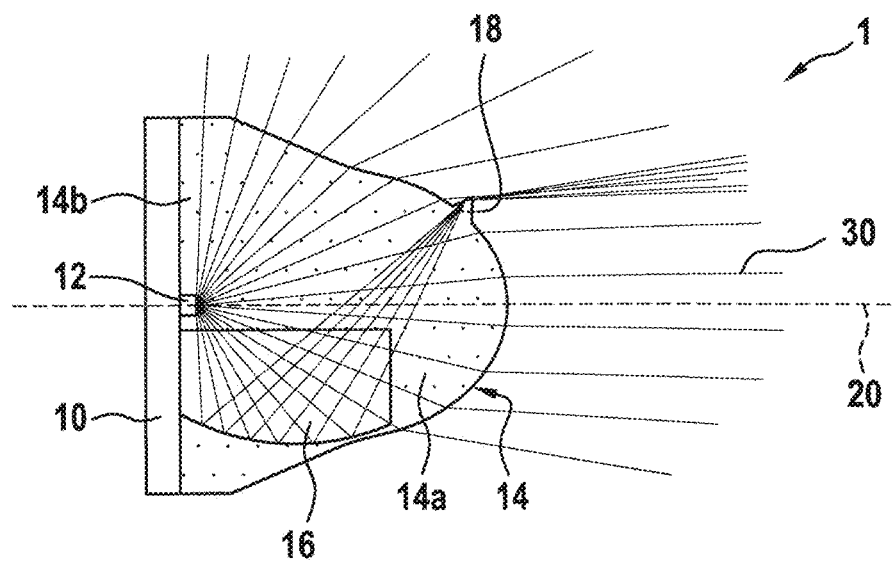
FIG. 1A shows a schematic cross-sectional view through an exterior aircraft light in accordance with an embodiment of the invention.

FIG. 1A shows a schematic cross-sectional view through an exterior aircraft light 1 in accordance with an exemplary embodiment of the invention.

The exterior aircraft light 1 comprises a mounting board 10 and an LED 12 as a light source. The LED 12 is arranged substantially at the center of the mounting board 10. The mounting board 10 may be a printed circuit board (PCB) or another suitable type of mounting board. The exterior aircraft light 1 further comprises a reflector 16 mounted on the mounting board 10. The reflector 16 may be made from metal and may have any shape which enables light, emitted by the LED 12, to be reflected in a desired manner. The reflector 16 may be made from metal or may have a metal coating, at least on the reflective surface facing the LED 12.

The exterior aircraft light 1 further comprises a lens 14, arranged over the LED 12 and the reflector 16. The lens 14 has a first lens portion 14a on a first side of a cross-sectional center plane 20, which is orthogonal to the mounting board 10 and runs through the LED 12. The lens 14 further comprises a second lens portion 14b on a second side of the cross-sectional center plane 20. In FIG. 1, the reflector 16 is provided in the first lens proportion 14a. It is also possible that part of the reflector 16 is placed in the second lens portion 14b. For example, when being measured as a percentage of a reflective surface of the reflector, between 70% and 100% of the reflector 16 can be arranged in the first lens portion 14a, while the remaining between 30% and 0% of the reflector 16 may be arranged in the second lens portion 14b. The reflector 16 may have a dimension such that between 25% and 50% of the light output of the LED 12 can be reflected by it.

Figure 2:
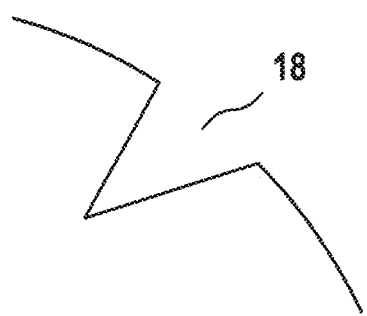
FIG. 2 shows various examples of the secondary light conditioning surface, as may be used in exterior aircraft lights in accordance with exemplary embodiments of the invention, in cross-sectional views.
Figure 2:
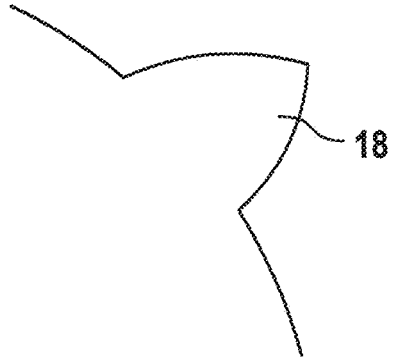
Figure 2:
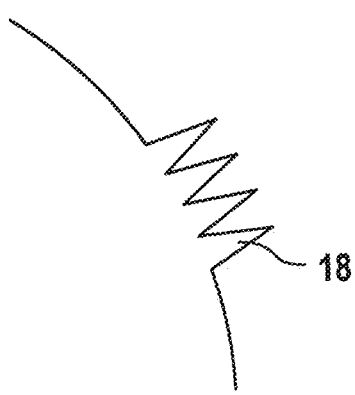

The lens 14 fully encloses both the LED 12 and the reflector 16. In particular, the lens 14 has an integral structure that is in direct contact with and fully encompasses the LED 12 and the reflector 16. As a particular embodiment, the lens 14 may be a one-piece silicone structure or an integral silicone structure. The lens of the exemplary embodiment of FIG. 2 is made from a soft silicone material. The soft silicone material is overmolded over the LED 12 and the reflector 16. In other words, the lens 14 is produced via a molding operation onto the LED 6 and the reflector 16. It is also possible that the lens 14 fully encompasses the mounting board 12 as well. The combination of the lens 14 and the reflector 16 allows for a high degree of freedom to shape the output light intensity distribution of the exterior aircraft light 1. Also, the configuration of the lens 14, which fully encloses the LED 12 and the reflector 16, provides for an effective protection of various components of the exterior aircraft light 1, in particular an effective protection of the LED 12 and the reflector 16, from the hazardous environment exposure.

The lens 14, in particular the second lens portion 14b, has a secondary light conditioning surface 18 formed thereon, which is configured to re-direct light, emitted by the LED 12 and reflected by the reflector 16, for light conditioning. The secondary light conditioning surface 18 may run along a portion of the circumference of the lens 14, in particular along a portion of the circumference of the lens in the second lens portion 14b, in a plane substantially parallel to the mounting board 10. It is also possible that a plane extending through the secondary light conditioning surface 18 is oblique with respect to the mounting board 10. The secondary light conditioning surface 18 may be present along the second lens portion 14b only or may extend to the first lens portion 14a. In FIG. 1, the secondary light conditioning surface 18 is a protrusion in the depicted cross-sectional view. Alternatively, the secondary light conditioning surface may be an indentation or may have a Fresnel lens shape. Depending on the type of the exterior aircraft light 1 and/or the light intensity distribution to be achieved, it is also possible to form a plurality of secondary light conditioning surfaces with the same or different sizes in different places of the lens 14.

Figure 1B:
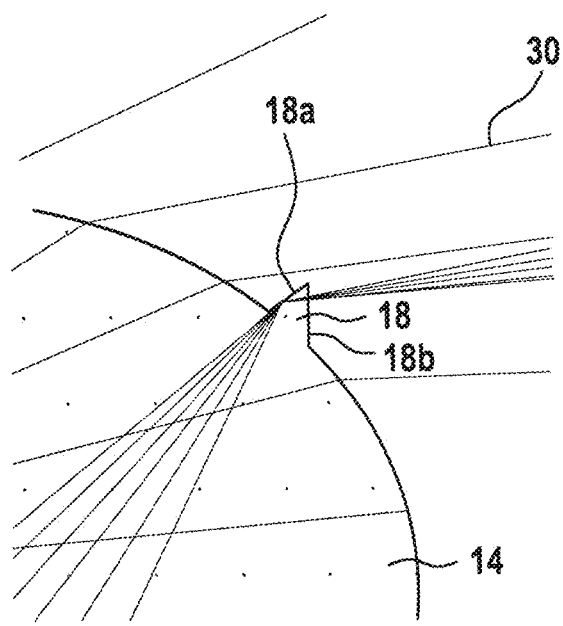
FIG. 1B shows an enlarged view of the secondary light conditioning surface of the exterior aircraft light of FIG. 1A in a cross-sectional view.

FIG. 1B shows an enlarged view of the secondary light conditioning surface 18 of the exterior aircraft light of FIG. 1A in a corresponding cross-sectional view. The secondary light conditioning surface 18 has a first surface 18a, which is a surface of total internal reflection for the light coming from the reflector 16, and a second surface 18b which is a surface of refraction for the light coming from the first surface 18a. FIG. 2 shows various examples of the secondary light conditioning surface 18, as may be used in exterior aircraft light in accordance with exemplary embodiments of the invention, in cross-sectional views. In FIG. 2(a), an indentation is formed as the secondary light conditioning surface 18. In FIG. 2(b), the first surface 18a and the second surface 18b of the secondary light conditioning surface 18 are curved-shaped. The first surface 18a and/or the second surface 18b may have a concave outline, contrary to that shown in FIG. 2(b). In FIG. 2(c), the secondary light conditioning surface 18 has a Fresnel lens shape. The secondary light conditioning surface 18 may also have other types of geometries, depending on the type of the exterior aircraft light 1 and/or the light intensity distribution to be achieved.

In FIGS. 1A and 1B, the conditioning of the output light intensity distribution by the lens 14 and the reflector 16 is illustrated via exemplary light rays 30. The exemplary light rays 30 are light rays, as emitted by the LED 12 during operation of the exterior aircraft light 1. In an embodiment, the reflector 16 has, in at least one cross-sectional plane, an elliptical shape having a first focal point at the LED 12 and a second focal point at the secondary light conditioning surface 18, in particular at the first surface 18a thereof. Part of light, emitted by the LED 12 towards the first lens portion 14a, is reflected by the reflector 16. The light reflected by the reflector 16 travels through the first lens portion 14a and then through the second lens portion 14b and is incident on the first surface 18a of the secondary light conditioning surface 18. The first surface 18a is angled with respect to a surface of the second lens portion 14b such that the light, coming from the reflector 16 and incident on the first surface 18a, is internally reflected and travels substantially into a forward direction which is orthogonal to the mounting board 10. By adjusting the angle of the first surface 18a with respect to the forward direction and/or by varying the number and/or locations of the secondary light conditioning surface 18, particular operations of light conditioning, such as a collimation of light in a target region, can be achieved.

In the exemplary embodiment of FIGS. 1A and 1B, the reflector 16 may have an ellipsoidal shape, i.e. the reflective surface of the reflector 16 may be a portion of an ellipsoid. In this way, a high amount of light, captured over a large solid angle in three dimensions, may be directed to a small area of the secondary lens conditioning surface 18. It is also possible that the reflector has an elliptical shape in a plurality of cross-sectional planes, without the reflective surface of the reflector being a portion of an ellipsoid. In this way, light may be efficiently directed to and distributed among a secondary light conditioning surface 18, running along a portion of the outer surface of the lens 14.

Figure 3A:
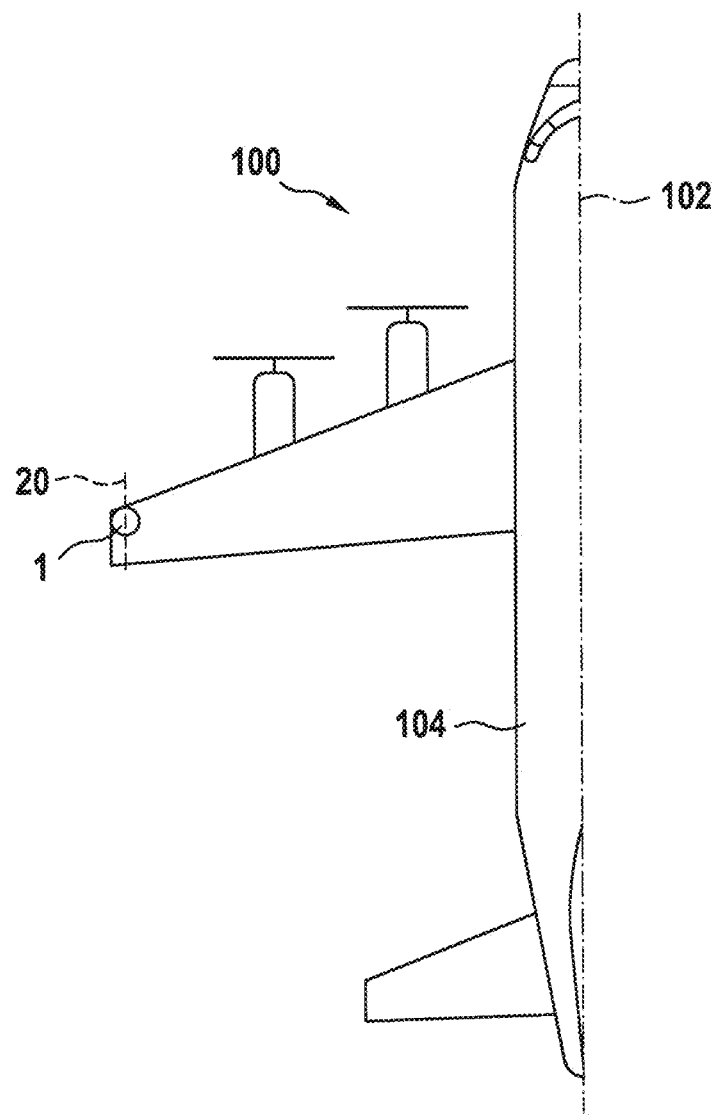
FIG. 3A shows an aircraft in accordance with an exemplary embodiment of the invention in a schematic top view.

FIG. 3A shows an aircraft 100 in accordance with an exemplary embodiment of the invention in a schematic top view. The aircraft 100 is equipped with a forward navigation light 1, positioned in a left wing tip of the aircraft 100. Being arranged on the left side of the aircraft 100, the forward navigation light 1 is a red forward navigation light, i.e. a forward navigation light emitting a red navigation light output. The forward navigation light 1 is an exterior aircraft light in accordance with an exemplary embodiment of the invention. Only half of the aircraft 100 is depicted in FIG. 3A. It is understood that the aircraft 100 is substantially symmetric with respect to its axis of longitudinal extension 102. Hence, an according forward navigation light in accordance with an exemplary embodiment of the invention, mirrored as compared to the depicted forward navigation light 1, is provided in the right wing tip as well. Said forward navigation light on the right side of the aircraft 100 is a green forward navigation light, i.e. a forward navigation light emitting a green navigation light output. The axis of longitudinal extension 102 is also the forward flight direction of the aircraft 100, when air borne.

Figure 3B:
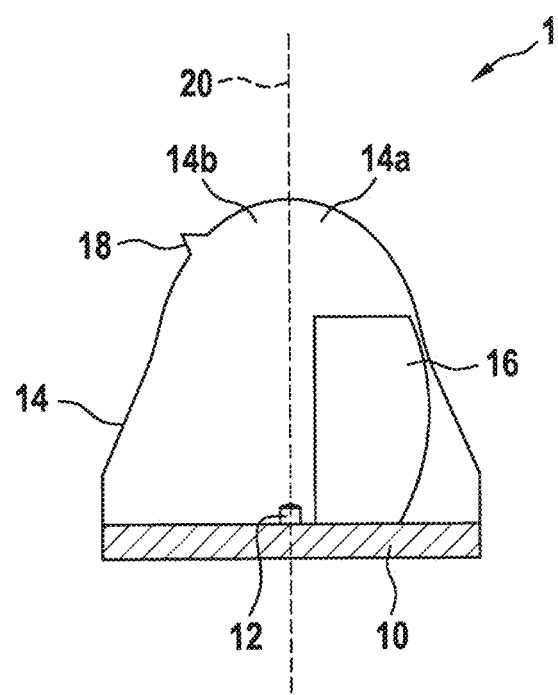
FIG. 3B shows a horizontal cross-sectional view through a forward navigation light of the aircraft of FIG. 3A, the forward navigation light being embodied in accordance with an exemplary embodiment of the invention.

FIG. 3B shows a cross-sectional view through the exterior aircraft light 1 of FIG. 3A. The cross-sectional plane of FIG. 3B is a horizontal plane in the aircraft frame of reference. In the exemplary embodiment of FIGS. 3A and 3B, the embodiment of the exterior aircraft light 1 is in compliance with the Federal Aviation Regulations (FAR) requirements for forward navigation lights. In particular, according to the FAR requirements, the forward navigation light 1 is required to have an output light emission distribution over an angular region of 110° in a horizontal cross-sectional plane through the forward navigation light 1. The output light emission distribution extends over an angular region from straight ahead, i.e. from the forward flight direction, to an angle of 110° counterclockwise. Further, the forward navigation light 1 of the exemplary embodiment of FIGS. 3A and 3B satisfies the minimum light intensity requirements, as laid out in sections 25.1391 and 25.1393 of the Federal Aviation Regulations, which have a peak around the forward flight direction of the aircraft.

The exterior aircraft light 1 of FIG. 3B has substantially the same configuration as that of FIG. 1A. Reference is made to above description of FIGS. 1A and 1B. In particular, the exterior aircraft light 1 of FIG. 3B comprises a mounting board 10, an LED 12, a lens 14 with a secondary light conditioning surface 18, and a reflector 16. The lens 14 is comprised of a first lens portion 14a and a second lens portion 14b, separated by a virtual plane laterally traversing the LED 12. As shown in FIGS. 3A and 3B, the cross-sectional center plane 20 is in parallel with the forward flight direction of the aircraft 102. The first lens portion 14a and the second lens portion 14b are provided on opposite sides of the cross-sectional center plane 20 such that the first lens portion 14a faces the fuselage 104 of the aircraft 100 and the second lens portion 14b faces the opposite, outboard direction. It is to be noted that the modifications, additional features, and effects, discussed above with respect to the embodiments of the exterior aircraft light 1, equally apply to the aircraft 100 as a whole.

In operation, light emitted by the LED 12 towards the first lens portion 14a is prevented by the reflector 16 from travelling inwards into a direction of the fuselage 104 of the aircraft 100 and, instead, is reflected by the reflector 16 to the secondary light conditioning surface 18 through the second lens portion 14b. The reflector thus prevents red light from travelling to the starboard side of the aircraft 100. The light incident on the secondary light conditioning surface 18, in particular incident on the first surface 18a, is internally reflected by the first surface 18a to be directed substantially into the forward flight direction of the aircraft 100. Light emitted by the LED towards the second lens portion 14b is refracted by the second lens portion 14b. In this way, the exterior aircraft light 1 is able to emit an effective forward navigation light output, which has a high light intensity around the flight direction of the aircraft 100 and a decreasing light intensity outwards therefrom. In this way, the FAR requirements for forward navigation lights may be satisfied in an effective and efficient manner.

Figure 4:
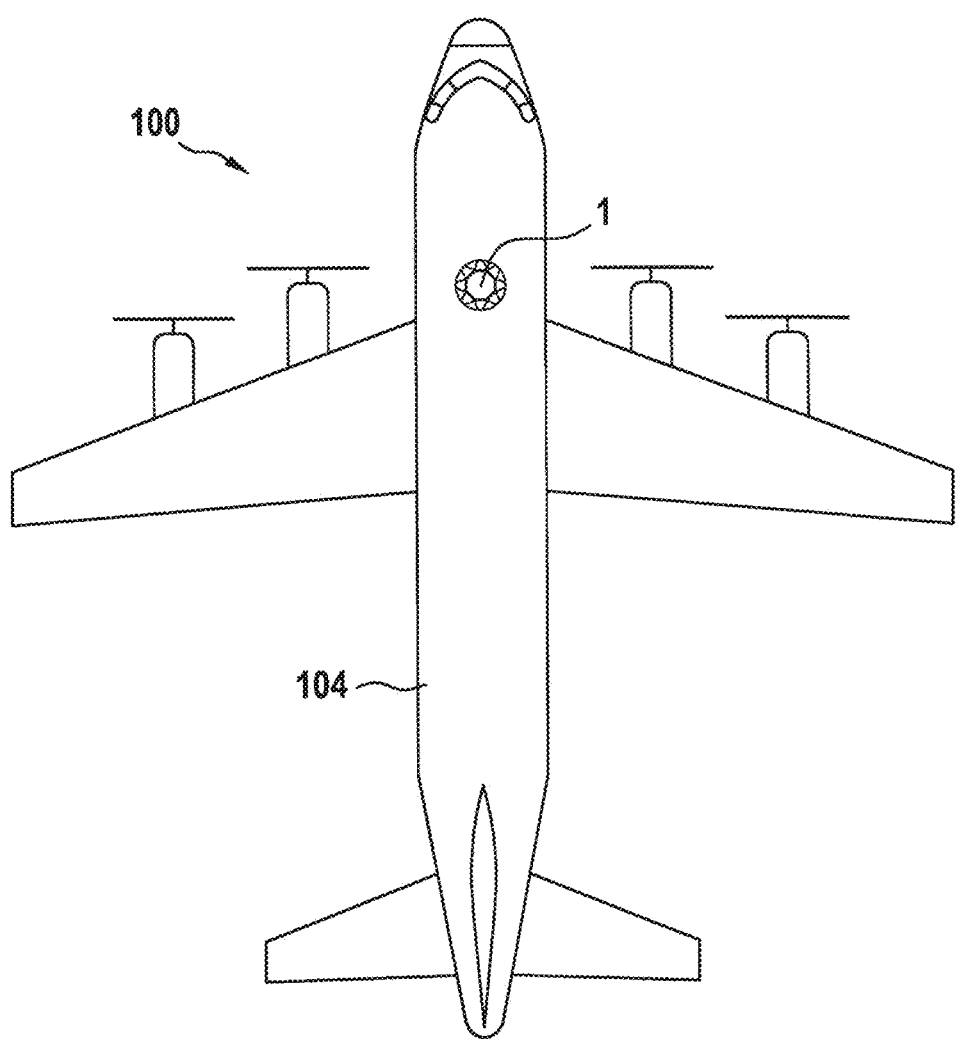
FIG. 4 shows an aircraft in accordance with an exemplary embodiment of the invention in a schematic top view.

FIG. 4 shows an aircraft 100 in accordance with an exemplary embodiment of the invention in a schematic top view. The aircraft 100 is equipped with an upper beacon light 1 in accordance with an exemplary embodiment of the invention, mounted to an upper portion of a fuselage 104 of the aircraft 100. The aircraft 100 also has a lower beacon light in accordance with an exemplary embodiment of the invention, mounted to a lower portion of the fuselage 104 of the aircraft 100. The lower beacon light is not depicted in FIG. 4, but is substantially a mirrored version of the upper beacon light 1.

Figure 5A:
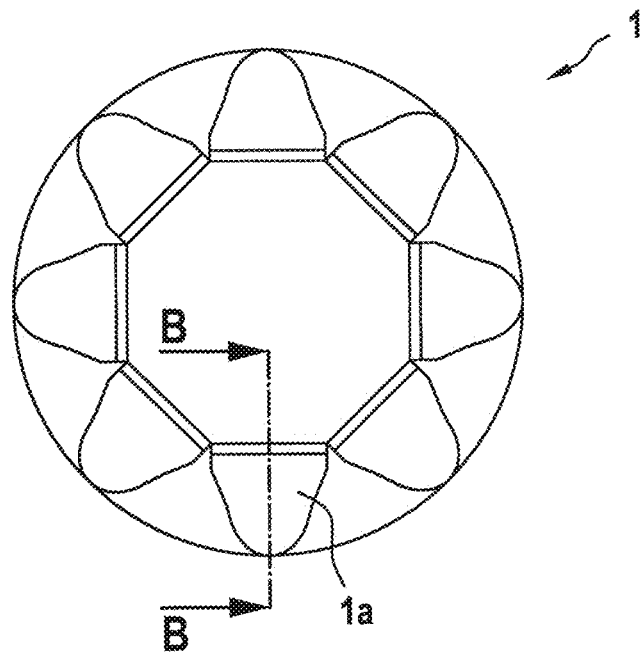
FIG. 5A shows an enlarged plan view of an upper beacon light of the aircraft of FIG. 4, the upper beacon light being embodied in accordance with an exemplary embodiment of the invention.
Figure 5B:
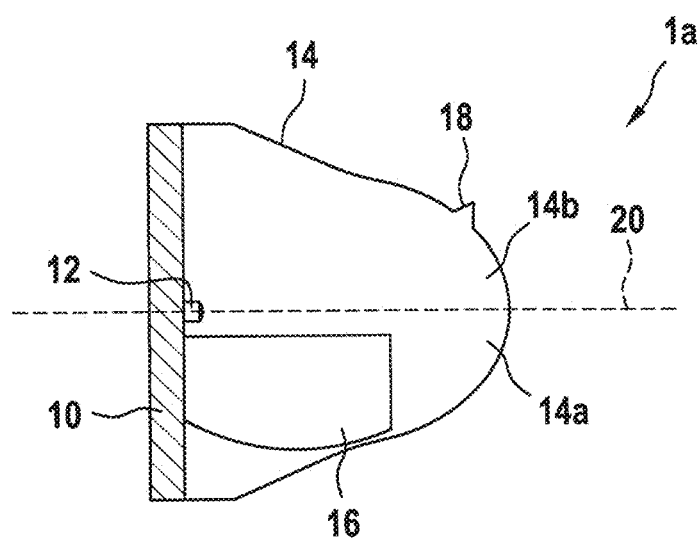
FIG. 5B shows a vertical cross-sectional view through a portion the upper beacon light of FIG. 5A.

FIG. 5A shows an enlarged plan view of the upper beacon light 1 of FIG. 4. FIG. 5B shows a cross-sectional view through an individual lighting module 1a of the upper beacon light 1 of FIG. 5A. The viewing direction of FIG. 5B is indicated by arrows B-B in FIG. 5A.

The upper beacon light 1 of FIG. 5A has a plurality of lighting modules 1a, radially arranged with respect to a center of the upper beacon light 1. Each of the plurality of lighting modules 1a basically has the configuration as described above with respect to the exterior aircraft light 1 of FIG. 1A. In particular, each lighting module 1a, as shown in FIG. 5B, comprises a mounting board 10, an LED 12, a lens 14 with a secondary light conditioning surface 18, and a reflector 16. The lens 14 is comprised of a first lens portion 14a and a second lens portion 14b, separated by a cross-sectional center plane 20. Each of the lighting modules 1a has the same cross-sectional view as shown for an individual lighting module in FIG. 5B. The first lens portion 14a and the second lens portion 14b are separated by the cross-sectional center plane 20 such that the first lens portion 14a faces the fuselage 104 and the second lens portion 14b faces the opposite direction. The modifications, additional features, and effects, discussed above with respect to the embodiments of the exterior aircraft light 1, equally also apply to the aircraft 100 as a whole.

In operation, light emitted by the LED 12 towards the first lens portion 14a is reflected by the reflector 16 to the secondary light conditioning surface 18 through the second lens portion 14b. In this way, light that would otherwise be incident on the fuselage of the aircraft 100 and would be wasted in terms of the output light intensity distribution of the upper beacon light may be made use of for the desired light output above the horizontal plane. The light incident on the secondary light conditioning surface 18, in particular incident on the first surface 18a, is internally reflected by the first surface 18a to be directed substantially into a radial direction, i.e. directed to be emitted around a horizontal plane in the aircraft frame of reference. Light emitted by the LED 12 towards the second lens portion 14b is refracted by the second lens portion 14b. In this way, efficiency of light distribution can be achieved by preventing light emitted by the LED 12 towards the first lens portion 14a from travelling towards a lower part of the upper beacon light 2. Also, the FAR requirements for beacon lights, as laid out in section 25.1401 of the Federal Aviation Regulations, may be satisfied in an effective and efficient manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
   a mounting board configured to be attached to an aircraft;
   a light source arranged on the mounting board;
   a lens arranged over the light source, the lens comprising a first lens portion on a first side of a cross-sectional center plane, which is orthogonal to the mounting board and which runs through the light source, and comprising a second lens portion on a second side of the cross-sectional center plane; and
   a reflector, arranged to reflect light, emitted by the light source into the first lens portion, towards the second lens portion;
   wherein the lens fully encloses the light source and the reflector,
   wherein the second lens portion of the lens has a secondary light conditioning surface, arranged to re-direct light, emitted by the light source and reflected by the reflector,
   wherein the secondary light conditioning surface is a protrusion or an indentation in the lens,
   wherein the secondary light conditioning surface is arranged to provide total internal reflection for light, emitted by the light source and reflected by the reflector, and
   wherein the secondary light conditioning surface is arranged to collimate light, emitted by the light source and reflected by the reflector.

2. The exterior aircraft light according to claim 1, wherein between 70% and 100% of the reflector is arranged in the first lens portion.

3. The exterior aircraft light according to claim 1, wherein between 70% and 100%, of light, emitted by the light source and reflected by the reflector, is reflected to travel through the second lens portion.

4. The exterior aircraft light according to claim 1, wherein the secondary light conditioning surface has a Fresnel lens shape.

5. The exterior aircraft light according to claim 1, wherein the reflector has, in at least one cross-sectional plane, an elliptical shape having a first focal point at the light source and a second focal point at the secondary light conditioning surface.

6. The exterior aircraft light according to claim 1,
   wherein the second lens portion has a further secondary light conditioning surface that is arranged to refract light, emitted by the light source and reflected by the reflector.

7. The exterior aircraft light according to claim 1,
   wherein the secondary light conditioning surface is arranged to re-direct between 50% and 100%, of light emitted by the light source and reflected by the reflector,
   or
   wherein the secondary light conditioning surface is arranged to re-direct between 0% and 10%, of light emitted by the light source and not reflected by the reflector.

8. The exterior aircraft light according to claim 1, wherein the light source is an LED.

9. The exterior aircraft light according to claim 1,
   wherein the lens is overmolded over the light source and the light reflector,
   or
   wherein the lens is made from a light transmissive silicone.

10. The exterior aircraft light according to claim 1, wherein the exterior aircraft light is one of a forward navigation light, a beacon light, and a combined wing and engine scan light.

11. An aircraft, comprising:

at least one exterior aircraft light according to claim 1, arranged on an outside of the aircraft.

12. The aircraft according to claim 11, wherein the exterior aircraft light is a forward navigation light, arranged in a wing tip region of the aircraft, with the first lens portion facing a fuselage of the aircraft and the second lens portion facing a wing tip of the aircraft.

13. The aircraft according to claim 11, wherein the exterior aircraft light is a beacon light, arranged on the top or the bottom of a fuselage of the aircraft, with the first lens portion facing the fuselage of the aircraft.

* * * * *